(12) United States Patent
Hassanpour et al.

(10) Patent No.: US 12,189,075 B2
(45) Date of Patent: Jan. 7, 2025

(54) BUILDING SCALABLE GEOLOGICAL PROPERTY MODELS USING MACHINE LEARNING ALGORITHMS

(71) Applicant: Landmark Graphics Corporation, Houston, TX (US)

(72) Inventors: Mehran Hassanpour, Houston, TX (US); Gaetan Bardy, Artiguelouve (FR); Genbao Shi, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 148 days.

(21) Appl. No.: 17/585,441

(22) PCT Filed: Dec. 3, 2019

(86) PCT No.: PCT/US2019/064262
§ 371 (c)(1),
(2) Date: Jan. 26, 2022

(87) PCT Pub. No.: WO2021/040763
PCT Pub. Date: Mar. 4, 2021

(65) Prior Publication Data
US 2023/0367031 A1 Nov. 16, 2023

Related U.S. Application Data

(60) Provisional application No. 62/891,740, filed on Aug. 26, 2019.

(51) Int. Cl.
*G01V 20/00* (2024.01)
*G06N 3/091* (2023.01)

(52) U.S. Cl.
CPC ............ *G01V 20/00* (2024.01); *G06N 3/091* (2023.01)

(58) Field of Classification Search
None
See application file for complete search history.

(56) References Cited

U.S. PATENT DOCUMENTS

| 6,278,949 B1 | 8/2001 | Alam |
| 7,310,579 B2 | 12/2007 | Ricard et al. |

(Continued)

FOREIGN PATENT DOCUMENTS

| EP | 3474045 A1 | 4/2019 |
| WO | WO-2019017962 A1 | 1/2019 |

OTHER PUBLICATIONS

International Search Report and Written Opinion for PCT Application No. PCT/US2019/064262, dated May 26, 2020.

*Primary Examiner* — Walter L Lindsay, Jr.
*Assistant Examiner* — Geoffrey T Evans
(74) *Attorney, Agent, or Firm* — Kilpatrick Townsend & Stockton LLP (57) ABSTRACT

A method of predicting rock properties at a selectable scale is provided, including receiving coordinates of locations of respective sample points, receiving measurement data associated with measurements or measurement interpretations for each sample point, receiving for each sample point a scale that indicates the scale used to obtain the measurements and/or measurement interpretations, wherein different scales are received for different sample points. A deep neural network (DNN) is trained by applying the received coordinates, measurement data, and scale associated with each sample point and associating the sample point with a rock property as a function of the coordinates, measurement data, and scale applied for the sample point. The DNN is configured to generate rock property data for a received request point having coordinates and a selectable scale, wherein the (Continued)

rock property data is determined for the request point as a function of the coordinates and the selectable scale.

12 Claims, 7 Drawing Sheets

(56) References Cited

U.S. PATENT DOCUMENTS

| | | |
|---|---|---|
| 9,128,203 B2 | 9/2015 | Al-Dossary et al. |
| 10,983,232 B2 * | 4/2021 | Ba .......................... G01V 1/306 |
| 2011/0238390 A1 | 9/2011 | Krebs et al. |
| 2013/0118736 A1 | 5/2013 | Usadi et al. |
| 2013/0346049 A1 | 12/2013 | Le Ravalec et al. |
| 2017/0285193 A1 | 10/2017 | Zhang et al. |
| 2019/0025461 A1 | 1/2019 | Wiener et al. |

* cited by examiner

BUILDING SCALABLE GEOLOGICAL PROPERTY MODELS USING MACHINE LEARNING ALGORITHMS

CROSS REFERENCE TO RELATED APPLICATION

This application is a 371 U.S. National Phase of International PCT Patent Application No. PCT/US2019/064262, filed on Dec. 3, 3019, which claims the benefit of U.S. Provisional Application No. 62/891,740 filed on Aug. 26, 2019. The contents of these applications are incorporated herein by reference in their entirety.

BACKGROUND

1. Field of the Disclosure

The present disclosure relates to building a scalable geological property model using machine learning algorithms, and more particularly, to integrating rock measurement data at multiple scales into the scalable geological property model.

2. Description of the Disclosure

Models for geological properties use data from different sources. Each source can measure data at a different scale. The model can be built at a particular scale, such as the average of the different scales used. Data is lost for those measurements that were captured using a higher resolution than the modeling scale selected. On the other hand, low accuracy is introduced for data captured using a lower resolution than the scale selected.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

A system and method are provided for building scalable geological property models using machine learning. The scalable geological property models have a selectable scale.

Figure 1:
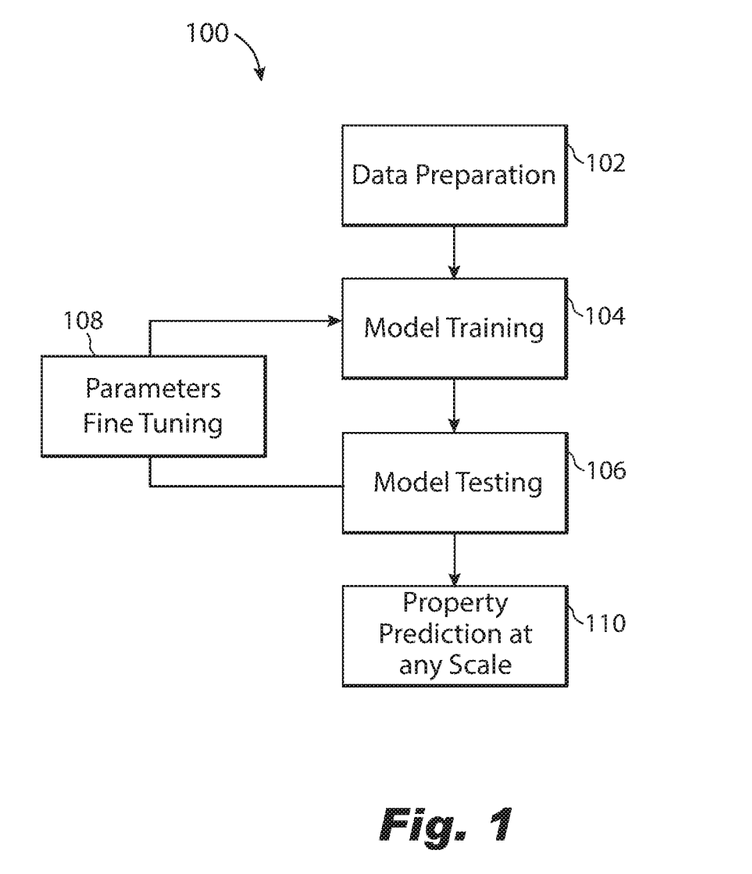
FIG. 1 shows a flow diagram of an example workflow for building and using a scalable geological property model in accordance with embodiments of the disclosure.

Turning now descriptively to the drawings, in which similar reference characters denote similar elements throughout the several views, FIG. 1 shows a flow diagram of an example high-level workflow 100 for building and using a scalable geological property model in accordance with embodiments of the disclosure. At stage 102 of workflow 100, measurement data is gathered and reformatted into a usable format. The measurement data can include actual measurements as output by measurement tools and/or evaluated data such as seismic interpretations, seismic attributes, petrophysical analysis, core plug analysis. Additionally, the measurement data can be obtained from input and output of an available model for a specific scale (e.g., reservoir scale). The measurement data is formed into training data and test data that is input to the model as individual data samples for training or testing the model. Each data sample has at least three features. A first feature represents coordinates of a sample point of the measurement data within a sample being studied, a second feature represents a scale of the measured data, and a third feature represents at least one measured or evaluated rock properties. The term scale is intended to be interpreted broadly, such as to represent a region of interest, sample size, level of interest, resolution, and/or geological scale. Once measurement data is prepared into data samples, it is divided into two sets, namely a training set of training samples and a testing set of testing samples.

At stage 104 the scalable geological property model is trained by applying data training samples of the training set and generating a rock property output for each data sample. The scalable geological property model can be trained by using large quantities of data samples. As one of their features, the training samples specify the scale at which they were obtained. At stage 106 the scalable geological property model is tested by applying data testing samples of the testing set, wherein each test sample has a known rock property, obtaining rock property output for each test sample. At stage 108 the known rock property is compared to the output rock property, and parameters of the scalable geological property model are fine-tuned based on a result of the comparison. At stage 110, the scalable geological property model is ready to be used for predicting rock properties for any input sample at a selected scale. The selected scale can be variable.

Figure 2:
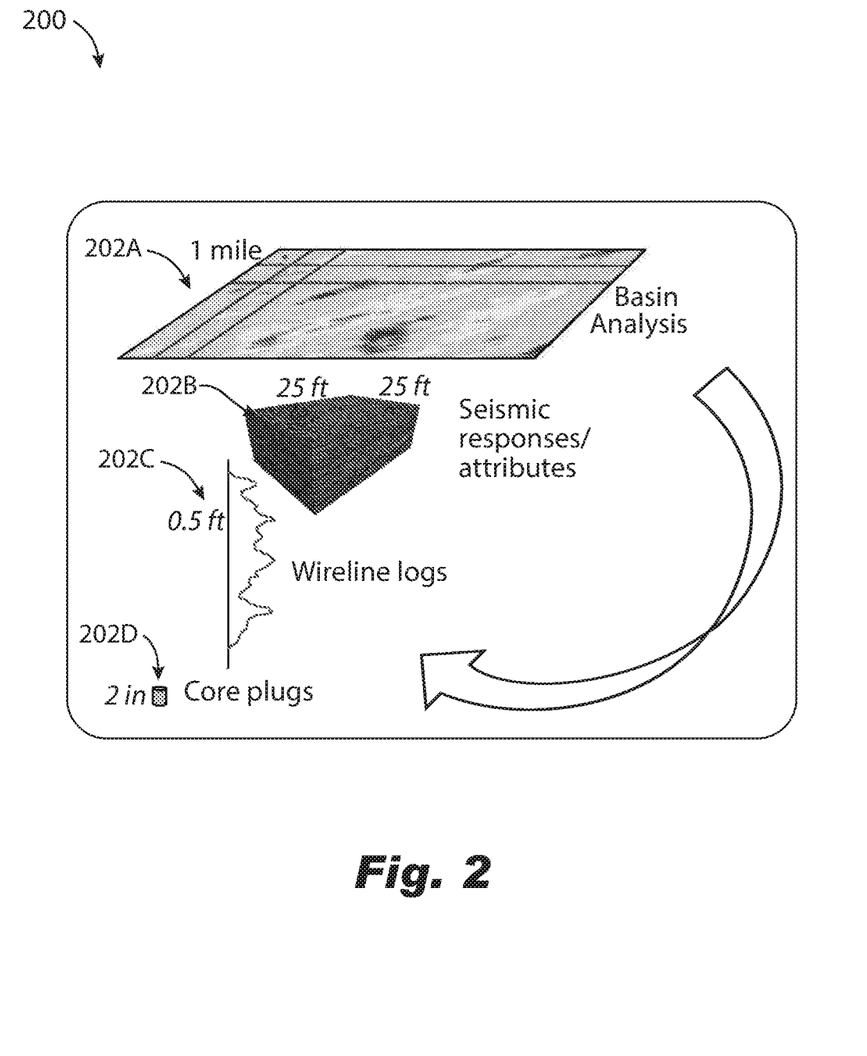
FIG. 2 shows example measurement data of various scales in accordance with embodiments of the disclosure.

FIG. 2 shows examples of measurement data 200 that was measured using various scales. Measurement data 202A is obtained at a first scale from a basin analysis of a one-mile× one-mile sample. Measurement data 202B is obtained at a second scale as seismic responses or attributes by studying the volume of a 25×25×10 ft volume sample. Measurement data 202C is obtained at a third scale via a wireline log of a 1.57 cubic ft sample (based on a 0.5 ft vertical resolution and a tool measurement radius of one ft). Measurement data 202D is obtained at a fourth scale via a core plug having a two-inch diameter for studying about a 6.5 cubic inch volume. Each of measurement data 202A-202D provide measurements or interpretations of measurements of subsurface rock properties, using a different resolution and different units such as for the purpose of hydrocarbon resource assessment. The measurement data can be obtained across asset lifecycle (from asset exploration to development) and across multiple disciplines (geology, drilling engineering, completion engineering, and reservoir engineering).

Figure 3:
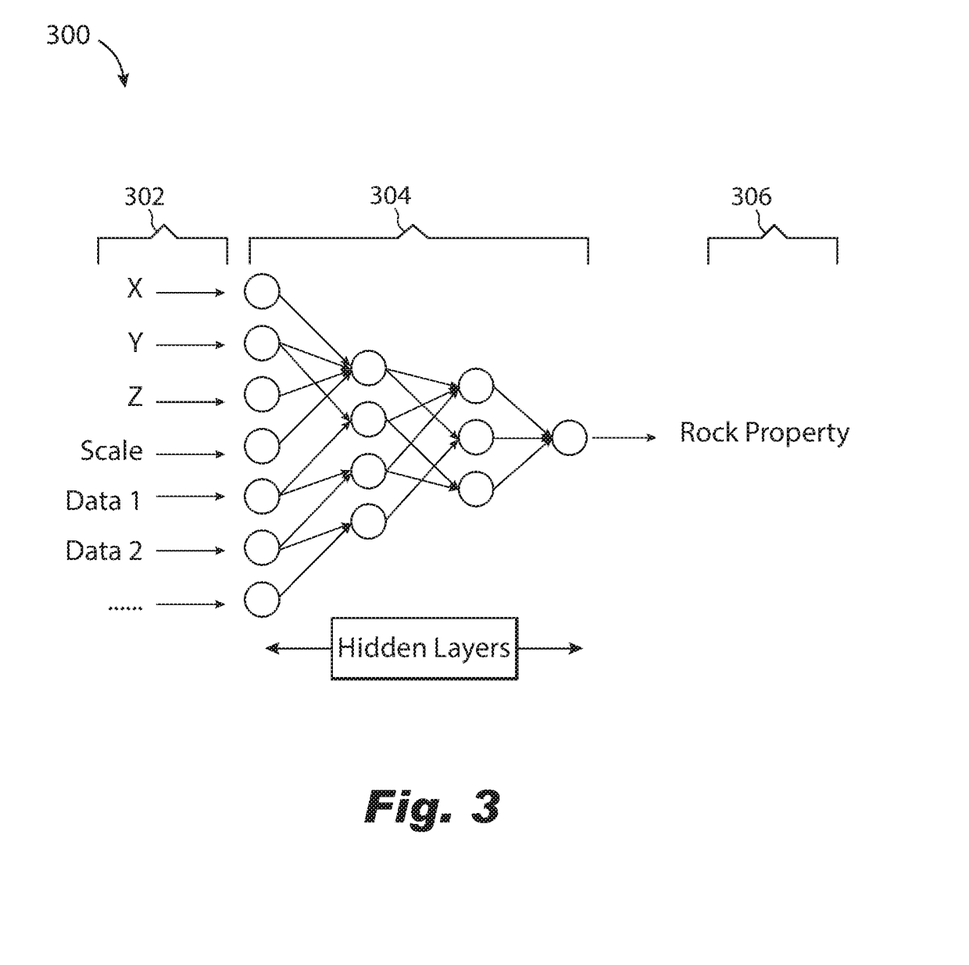
FIG. 3 shows a block diagram of an example scalable geological property model being built in accordance with embodiments of the disclosure.

FIG. 3 shows a block diagram of an example scalable geological property model being built by applying data samples 302 of the training data or testing data to a deep neural network (DNN) 304. The data sample includes (at least) the X, Y, Z coordinates of the data sample, a scale at which the data sample was obtained, and one or more measurement data elements (shown as Data 1 and Data 2). The DNN outputs a rock property 306.

The DNN 304 uses machine learning to combine multiscale data samples to build a scalable geological property model that is gridless, with increased flexibility and efficiency relative to models that use a grid of a fixed scale.

Figure 4:
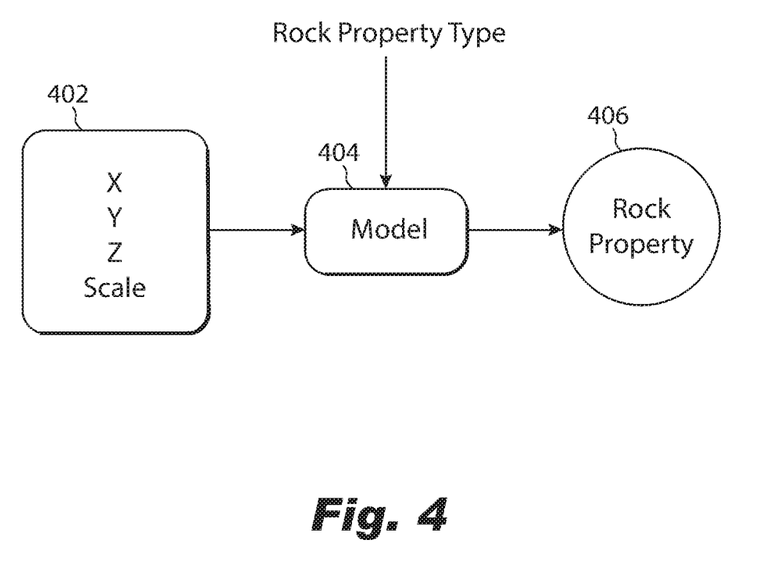
FIG. 4 shows a block diagram of an example scalable geological property model in use in accordance with embodiments of the disclosure.

FIG. 4 shows a block diagram of an example scalable geological property model 404 of stage 108 that was built and tested in stages 104 and 106, as shown in FIG. 1. An input sample 402 is input to the built scalable geological property model 404. The input sample specifies coordinates of the input sample for which knowledge of a rock property is sought. The input sample further specifies a selected scale or which the analysis is to be performed. A rock property request is input to the scalable geological property model 404 that specifies a type of rock property for which data is sought. A value for a rock property 406 of the requested rock property type at the requested coordinates is output.

Advantageously, the scalable geological property model 404 integrates direct and indirect rock measurement data at multiple scales into a consistent 3D geological model across multiple scales. The machine learning technique provides an ability to train and test a model using data of different scales, wherein the training and testing is a function of the scale. The model can be used to obtain accurate output at a selectable scale. The model can be trained and tested with, and used for, various lifecycle stages, from asset exploration to development, across multiple disciplines (geology, drilling engineering, completion engineering, and reservoir engineering), with the ability to provide accurate information for rock properties of an input point at requested coordinates for a requested scale.

Figure 5:
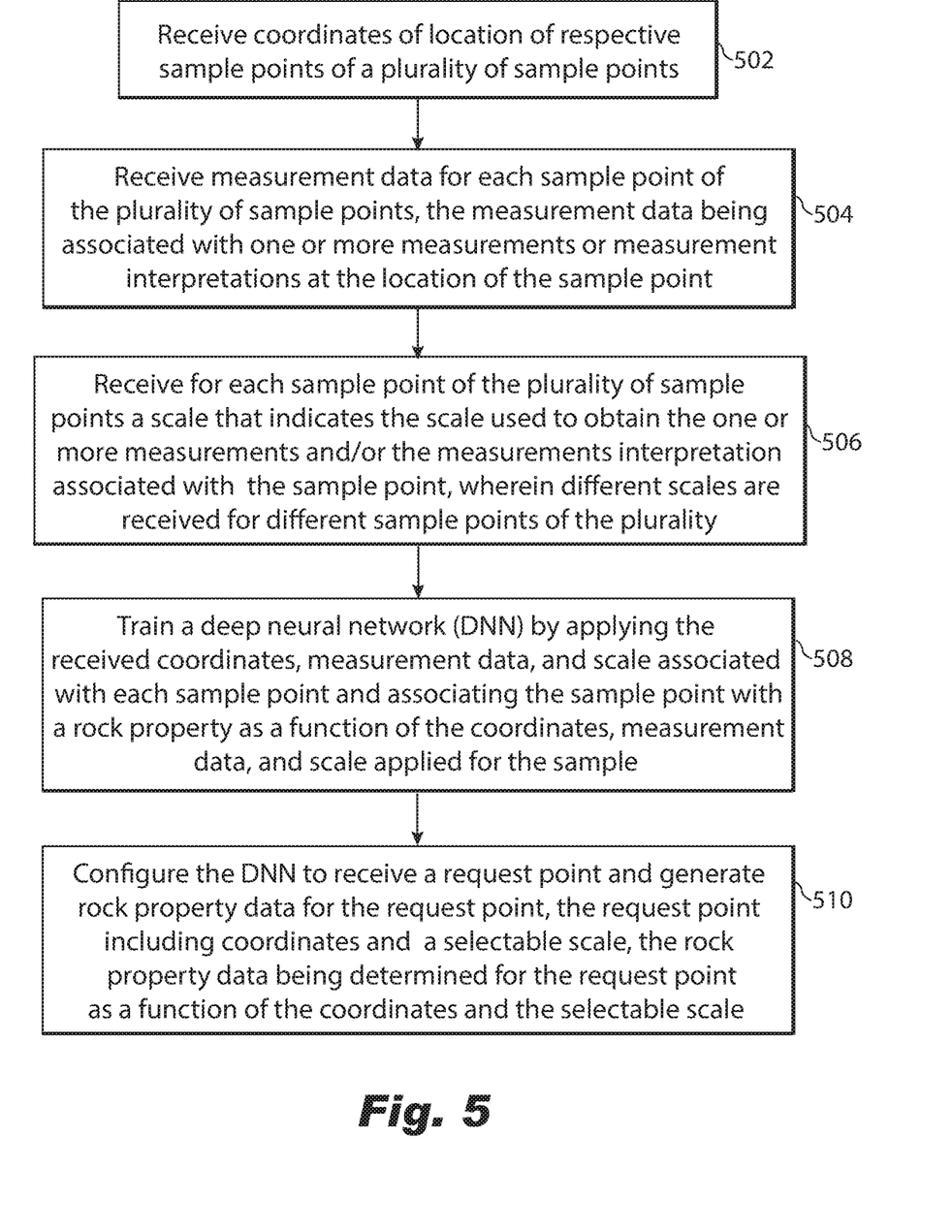
FIG. 5 shows a method for predicting rock properties at a selectable scale in accordance with embodiments of the disclosure.
Figure 6:
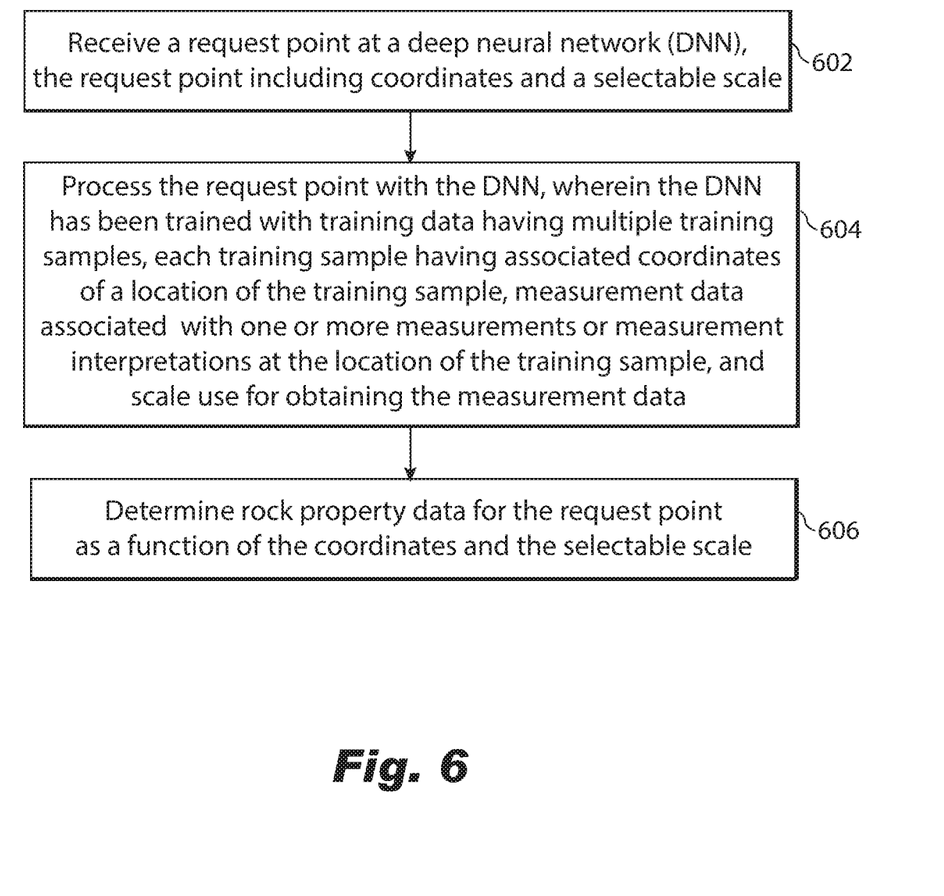
FIG. 6 shows a method for predicting rock properties at a selectable scale in accordance with further embodiments of the disclosure.

With reference now to FIGS. 5 and 6, shown are flowcharts demonstrating implementation of an exemplary embodiment of a method of the disclosure. It is noted that the order of operations shown in FIGS. 5 and 6 is not required, so in principle, the various operations may be performed out of the illustrated order. Also, certain operations may be skipped, different operations may be added or substituted, or selected operations or groups of operations may be performed in a separate application following the embodiments described herein. The operations shown in FIGS. 5 and 6 can be performed by a rock properties analysis system 700, such as rock properties analysis system 700 shown in FIG. 7, for performing a method to predict rock properties at a selectable scale. In particular, a CPU 704 may execute one or more of the software modules of a rock properties analysis tool 720 and a scalable geological property model 722 of FIG. 7, causing the CPU 704 to perform the operations shown in the flowchart and described in the disclosure.

With reference to FIG. 5, at block 502, coordinates are received of locations of respective sample points of a plurality of sample points. At block 504, measurement data is received for each sample point of the plurality of sample points, the measurement data being associated with one or more measurements or measurement interpretations at the location of the sample point. At block 506, a scale is received for each respective sample point, which indicates the scale used to obtain the one or more measurements and/or the measurements interpretation associated with the sample point. Different scales are received for different sample points. At block 508, a DNN is trained by (a) applying the received coordinates, measurement data, and scale associated with each sample point and (b) associating the sample point with a rock property as a function of the coordinates, measurement data, and scale applied for the sample point. At block 510, the DNN is configured to receive a request point and generate rock property data for the request point. The request point includes coordinates and a selectable scale, and the rock property data is determined for the request point as a function of the coordinates and the selectable scale.

With reference to FIG. 6, at block 602, a request point is received at a deep neural network (DNN). The request point includes coordinates and a selectable scale. At block 604, the request point is processed with the DNN, wherein the DNN has been trained with training data having multiple training samples. Each training sample has associated coordinates of a location of the training sample, measurement data associated with one or more measurements or measurement interpretations at the location of the training sample, and scale use for obtaining the measurement data. At block 606, rock property data is determined for the request point as a function of the coordinates and the selectable scale.

In accordance with an aspect of the disclosure, a method is provided for predicting rock properties at a selectable scale. The method includes receiving coordinates of location of respective sample points of a plurality of sample points, receiving measurement data for each sample point of the plurality of sample points, the measurement data being associated with one or more measurements or measurement interpretations at the location of the sample point, and receiving for each sample point of the plurality of sample points a scale that indicates the scale used to obtain the one or more measurements and/or the measurements interpretation associated with the sample point, wherein different scales are received for different sample points of the plurality. The method further includes training a DNN by applying the received coordinates, measurement data, and scale associated with each sample point and associating the sample point with a rock property as a function of the coordinates, measurement data, and scale applied for the sample point. The method further includes configuring the DNN to receive a request point and generate rock property data for the request point, the request point including coordinates and a selectable scale, the rock property data being determined for the request point as a function of the coordinates and the selectable scale.

In accordance with one or more embodiments, the DNN may be gridless.

In accordance with one or more embodiments, the plurality of sample points can be associated with multiple volumetric samples of different sizes.

In accordance with one or more embodiments, the method can further include receiving the request and generating the rock property.

In accordance with another aspect of the disclosure, a method of predicting rock properties at a selectable scale is provided. The method includes receiving a request point at a deep neural network (DNN), the request point including coordinates and a selectable scale. The method further includes processing the request point with the DNN, wherein the DNN has been trained with training data having multiple training samples, each training sample having associated coordinates of a location of the training sample, measurement data associated with one or more measurements or measurement interpretations at the location of the training sample, and scale use for obtaining the measurement data. The method further includes determining rock property data for the request point as a function of the coordinates and the selectable scale.

In accordance with one or more embodiments, the DNN may be gridless. In accordance with one or more embodiments, the plurality of training samples can be associated with multiple volumetric samples of different sizes.

Figure 7:
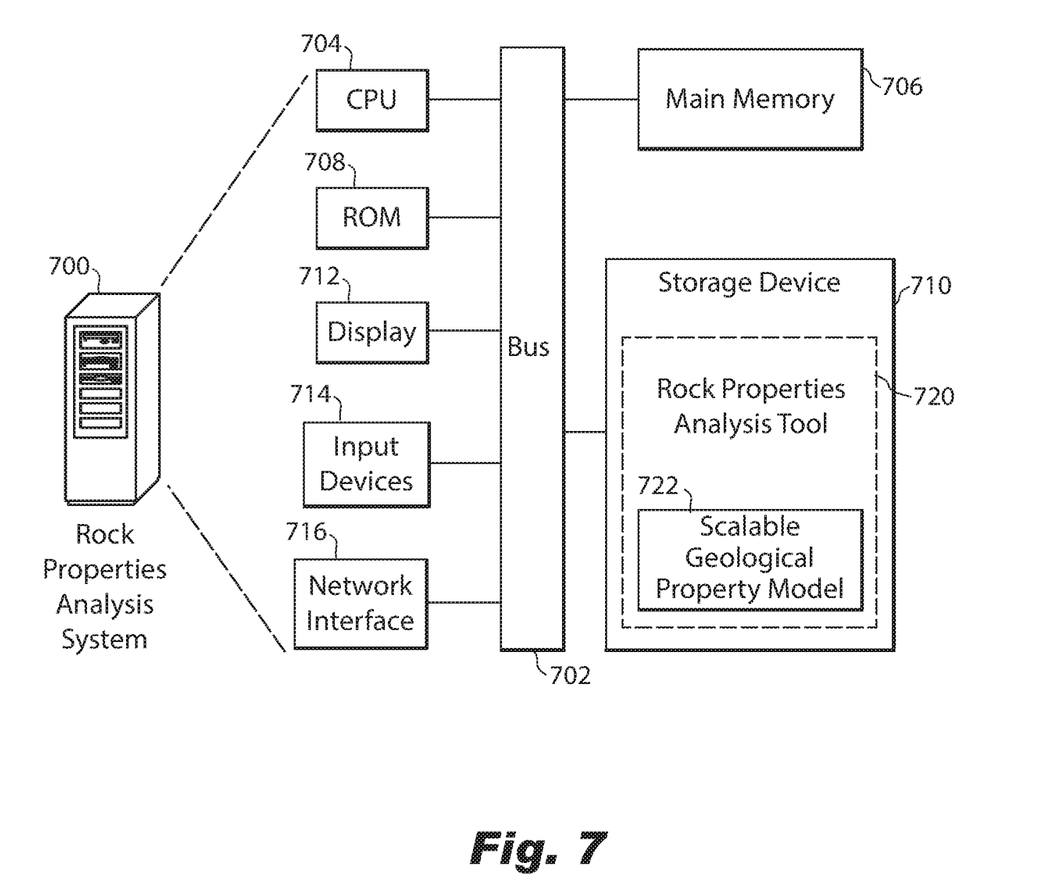
FIG. 7 shows an exemplary rock properties analysis system which may be used with the scalable geological property model according to embodiments of the disclosure.

FIG. 7 shows an exemplary implementation of a rock properties analysis system 700 that may be used with the scalable geological property model according to embodiments disclosed herein. The rock properties analysis system 700 may be a conventional computing system, such as a workstation, desktop, or laptop computer, or it may be a cloud-based computing system or an edge computing device. The rock properties analysis system 700 may also be a custom computing system developed for a particular application. Such a rock properties analysis system 700 may be located downhole, on the surface of an offshore or an onshore well site, or at a remote location, or a portion of the system 700 may be located downhole, a portion located on the surface, and/or a portion located at a remote location.

In a typical arrangement, rock properties analysis system 700 includes a bus 702 or other communication pathway for transferring information among other components within the system 700, and a CPU 704 coupled with the bus 702 for processing the information. The system 700 may also include a main memory 706, such as a random-access memory (RAM) or other dynamic storage device coupled to the bus 702 for storing computer-readable instructions to be executed by the CPU 704. The main memory 706 may also be used for storing temporary variables or other intermediate information during execution of the instructions by the CPU 704.

The system 700 may further include a read-only memory (ROM) 708 or other static storage device coupled to the bus 702 for storing static information and instructions for the CPU 704. A computer-readable storage device 710, such as a nonvolatile memory (e.g., flash memory) drive or magnetic disk, may be coupled to the bus 702 for storing information and instructions for the CPU 704. The CPU 704 may also be coupled via the bus 702 to a display 712 for displaying information to a user. One or more input devices 714, including alphanumeric and other keyboards, mouse, trackball, cursor direction keys, and so forth, may be coupled to the bus 702 for transferring information and command selections to the CPU 704. A communications interface 716 may be provided for allowing the system 700 to communicate with an external system or network.

The term "computer-readable instructions" as used above refers to any instructions that may be performed by the CPU 704 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 710. Volatile media may include dynamic memory, such as main memory 706. Transmission media may include coaxial cables, copper wire and fiber optics, including the wires of the bus 702. Transmission itself may take the form of electromagnetic, acoustic or light waves, such as those generated for radio frequency (RF) and infrared (IR) data communications. Common forms of computer-readable media may include, for example, magnetic medium, optical medium, memory chip, and any other medium from which a computer can read.

In accordance with one or more disclosed embodiments, a rock properties analysis tool 720, or the computer-readable instructions therefor, may also reside on or be downloaded to the storage device 710 for execution. Such a rock properties analysis tool 720 may be a standalone tool or it may be integrated with other tools as part of an overall analysis software package. The rock properties analysis tool 720 may be implemented in any suitable computer programming language or software development package known to those having ordinary skill in the art, including various versions of Java, SAS, Python, C/C++/C#, R, SPSS, MATLAB, and the like.

In the FIG. 7 example, the rock properties analysis tool 720 comprises a number of components, including at least one scalable geological property model 722 discussed herein. The rock properties analysis tool 720 may use the scalable geological property model 722 to analyze various rocks and subterranean geological formations as described herein, and the results produced by tool 720 may then be presented on the display 712 in a known manner Such results may also be provided to remotely located technicians and operators through the network interface 716.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method of predicting rock properties at a selectable scale, the method comprising:
receiving coordinates of location of respective sample points of a plurality of sample points;
receiving measurement data for each sample point of the plurality of sample points, the measurement data being associated with one or more measurements or measurement interpretations at the location of the sample point;
receiving, for each sample point of the plurality of sample points, a scale that indicates a measurement volume and a resolution used to obtain the one or more measurements, the measurements interpretation associated with the sample point, or a combination thereof, wherein different measurement volumes are received for different sample points of the plurality of sample points;
training a deep neural network (DNN) by applying the received coordinates, the resolution, the measurement data, and the measurement volume associated with each sample point of the plurality of sample points;
associating the sample point with a rock property as a function of the received coordinates, the measurement data, and the measurement volume applied for the sample point; and
configuring the DNN to receive a request point and generate rock property data for the request point, the request point including coordinates and a selectable measurement volume, the rock property data being determined for the request point as a function of the coordinates and the selectable measurement volume.

2. The method of claim 1, further comprising: applying a portion of the plurality of sample points having a known rock property for testing and adjusting the DNN.

3. The method of claim 1, wherein the DNN is gridless.

4. The method of claim 1, further comprising:
receiving the request; and
generating the rock property.

5. A method of predicting rock properties at a selectable scale, the method comprising:
receiving a request point at a deep neural network (DNN), the request point including coordinates and a selectable scale that indicates a measurement volume and a resolution used to obtain one or more measurements, measurements interpretation associated with a respective sample of a plurality of training samples, or a combination thereof;
processing the request point with the DNN, wherein the DNN has been trained with training data having the plurality of training samples, each training sample having associated coordinates of a location of the training sample, measurement data associated with the one or more measurements or the measurement interpretations at the location of the training sample, and the measurement volume and resolution used for obtaining the measurement data; and
determining rock property data for the request point as a function of the coordinates and the selectable scale.

6. The method of claim 5, wherein the DNN is gridless.

7. A system for analyzing rock properties, comprising:
a processor;
a storage device communicatively coupled to the processor and storing computer-readable instructions thereon;
wherein the computer-readable instructions, when executed by the processor, cause the system to perform operations for:
receiving coordinates of location of respective sample points of a plurality of sample points;
receiving measurement data for each sample point of the plurality of sample points, the measurement data being associated with one or more measurements or measurement interpretations at the location of the sample point;
receiving for each sample point of the plurality of sample points a scale that indicates a measurement volume and a resolution used to obtain the one or more measurements, the measurements interpretation associated with the sample point, or a combination thereof, wherein different measurement volumes are received for different sample points of the plurality of sample points;
training a deep neural network (DNN) by applying the received coordinates, the resolution, the measurement data, and the measurement volume associated with each sample point of the plurality of sample points;
associating the sample point with a rock property as a function of the received coordinates, the measurement data, and measurement volume applied for the sample point; and
configuring the DNN to receive a request point and generate rock property data for the request point, the request point including coordinates and a selectable measurement volume, the rock property data being determined for the request point as a function of the coordinates and the selectable measurement volume.

8. The system of claim 7, further comprising applying a portion of the plurality of sample points having a known rock property for testing and adjusting the DNN.

9. The system of claim 7, wherein the DNN is gridless.

10. The system of claim 7, further comprising:
receiving the request; and
generating the rock property.

11. A system for analyzing rock properties, comprising:
a processor;
a storage device communicatively coupled to the processor and storing computer-readable instructions thereon;
wherein the computer-readable instructions, when executed by the processor, cause the system to perform operations for:
receiving a request point at a deep neural network (DNN), the request point including coordinates and a selectable scale that indicates a measurement volume and a resolution used to obtain one or more measurements, measurements interpretation associated with a respective sample of a plurality of training samples, or a combination thereof;
processing the request point with the DNN, wherein the DNN has been trained with training data having the plurality of training samples, each training sample having associated coordinates of a location of the training sample, measurement data associated with the one or more measurements or the measurement interpretations at the location of the training sample, and the measurement volume and resolution used for obtaining the measurement data; and determining rock property data for the request point as a function of the coordinates and the selectable scale.

12. The system of claim 11, wherein the DNN is gridless.

* * * * *